United States Patent
Jin et al.

(10) Patent No.: US 9,554,073 B2
(45) Date of Patent: Jan. 24, 2017

(54) INTEGRATED CIRCUIT AND IMAGE SENSOR COMPRISING SAME

(71) Applicant: SAMSUNG ELECTRONICS CO., LTD., Suwon-si, Gyeonggi-Do (KR)

(72) Inventors: Eun-Young Jin, Hwaseong-si (KR); Kyo-Jin Choo, Seoul (KR); Yu-Jin Park, Seoul (KR); Han-Kook Cho, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 301 days.

(21) Appl. No.: 14/488,637

(22) Filed: Sep. 17, 2014

(65) Prior Publication Data
US 2015/0076324 A1    Mar. 19, 2015

(30) Foreign Application Priority Data
Sep. 17, 2013    (KR) .................. 10-2013-0112113

(51) Int. Cl.
*H04N 5/335* (2011.01)
*H04N 5/378* (2011.01)

(52) U.S. Cl.
CPC ............ *H04N 5/378* (2013.01); *H04N 5/3355* (2013.01)

(58) Field of Classification Search
CPC .. H04N 5/3355; H04N 5/3742; H04N 5/3765; H04N 5/378
USPC .......... 250/208.1, 214 R; 327/141, 151, 152; 345/214
See application file for complete search history.

(56) References Cited

U.S. PATENT DOCUMENTS

| | | | | |
|---|---|---|---|---|
| 6,151,682 | A | * 11/2000 | van der Wal | G06F 5/06 327/149 |
| 7,395,404 | B2 | 7/2008 | Gorobets et al. | |
| 8,035,717 | B2 | 10/2011 | Hisamatsu | |
| 8,130,295 | B2 | 3/2012 | Okumura | |
| 9,412,342 | B2 * | 8/2016 | Choi | G09G 3/3648 |
| 2006/0044296 | A1 * | 3/2006 | Murade | G09G 3/3648 345/204 |
| 2008/0136933 | A1 | 6/2008 | Dosluoglu et al. | |
| 2009/0066790 | A1 | 3/2009 | Hammadou | |
| 2010/0318646 | A1 | 12/2010 | Ungermann | |
| 2012/0008033 | A1 | 1/2012 | Hisamatsu | |

FOREIGN PATENT DOCUMENTS

JP    2011-129183    6/2011

* cited by examiner

*Primary Examiner* — Kevin Pyo
(74) *Attorney, Agent, or Firm* — Volentine & Whitt, PLLC

(57) ABSTRACT

An integrated circuit comprises a first signal transfer block comprising first through (M)-th aligning blocks that are cascade-coupled to produce first aligned control signals through (M)-th aligned control signals, respectively, by aligning first control signals with a clock signal, wherein M is an integer greater than one, and a functional block divided into first through (M)-th sub-functional blocks configured to perform a same function in parallel, each of the first through (M)-th sub-functional blocks operating according to corresponding ones of the first aligned control signals through (M)-th aligned control signals generated by the first through (M)-th aligning blocks.

20 Claims, 18 Drawing Sheets

INTEGRATED CIRCUIT AND IMAGE SENSOR COMPRISING SAME

CROSS-REFERENCE TO RELATED APPLICATION

This application claims priority under 35 USC §119 to Korean Patent Application No. 10-2013-0112113 filed on Sep. 17, 2013, the disclosure of which is hereby incorporated by reference.

BACKGROUND OF THE INVENTION

Embodiments of the inventive concept relate generally to integrated circuits, and more particularly to an integrated circuit operating based on aligned control signals and an image sensor comprising the integrated circuit.

Recently, image sensors with a large die size have been developed to capture high definition image data. These image sensors generally receive control signals through relatively long signal transfer lines, so they may include buffers to compensate for deterioration of the control signals through those lines. Additionally, differences between skews of the control signals transferred through the signal transferring lines may cause performance degradation or functional errors of the image sensors.

SUMMARY OF THE INVENTION

In one embodiment of the inventive concept, an integrated circuit comprises a first signal transfer block comprising first through (M)-th aligning blocks that are cascade-coupled to produce first aligned control signals through (M)-th aligned control signals, respectively, by aligning first control signals with a clock signal, wherein M is an integer greater than one, and a functional block divided into first through (M)-th sub-functional blocks configured to perform a same function in parallel, each of the first through (M)-th sub-functional blocks operating according to corresponding ones of the first aligned control signals through (M)-th aligned control signals generated by the first through (M)-th aligning blocks.

In another embodiment of the inventive concept, an image sensor comprises pixels configured to provide analog signals corresponding to intensity information of incident light, comparators configured to produce compared result signals by comparing the analog signals to a ramp signal, a first signal transfer block divided into first through (M)-th aligning blocks that are cascade-coupled to provide first aligned control signals through (M)-th aligned control signals by aligning first control signals with a clock signal, wherein M is an integer greater than one, and a count executing block divided into first through (M)-th count executing units configured to perform a same counting function in parallel, each of the first through (M)-th count executing units operating based on the compared result signals and each of the first aligned control signals through (M)-th aligned control signals generated by the first through (M)-th aligning blocks, respectively.

In yet another embodiment of the inventive concept, a method comprises generating analog signals corresponding to intensity information of incident light, comparing the analog signals to a ramp signal to produce compared result signals, aligning first control signals with a clock signal to produce aligned control signals, and performing a counting function by operating a plurality of count executing units in parallel based on the compared result signals and the aligned control signals.

In these and other embodiments of the inventive concept, the aligning blocks in the signal transfer block may align the control signals and transfer the aligned control signals to each of the sub-functional blocks in the integrated circuit and each of the counters in an image sensor, which may reduce certain forms of overhead such as timing margins or transferring channel matching.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

In the description that follows, the terms first, second, third etc. may be used to describe various features, but the described features should not be limited by these terms. Rather, these terms are used merely to distinguish between different features. Thus, a first feature discussed below could be termed a second feature and vice versa. As used herein, the term "and/or" indicates any and all combinations of one or more of the associated listed items.

Where a feature is referred to as being "connected" or "coupled" to another feature, it can be directly connected or coupled to the other feature or intervening features may be present. In contrast, when an feature is referred to as being "directly connected" or "directly coupled" to another feature, there are no intervening features present. Other words used to describe the relationship between features should be interpreted in a like fashion (e.g., "between" versus "directly between," "adjacent" versus "directly adjacent," etc.).

The terminology used herein is for the purpose of describing embodiments only and is not intended to limit the inventive concept. As used herein, the singular forms "a," "an" and "the" are intended to encompass the plural forms as well, unless the context clearly indicates otherwise. The terms "comprises" and/or "comprising," where used herein, indicate the presence of stated features but do not preclude the presence or addition of one or more other features. In some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
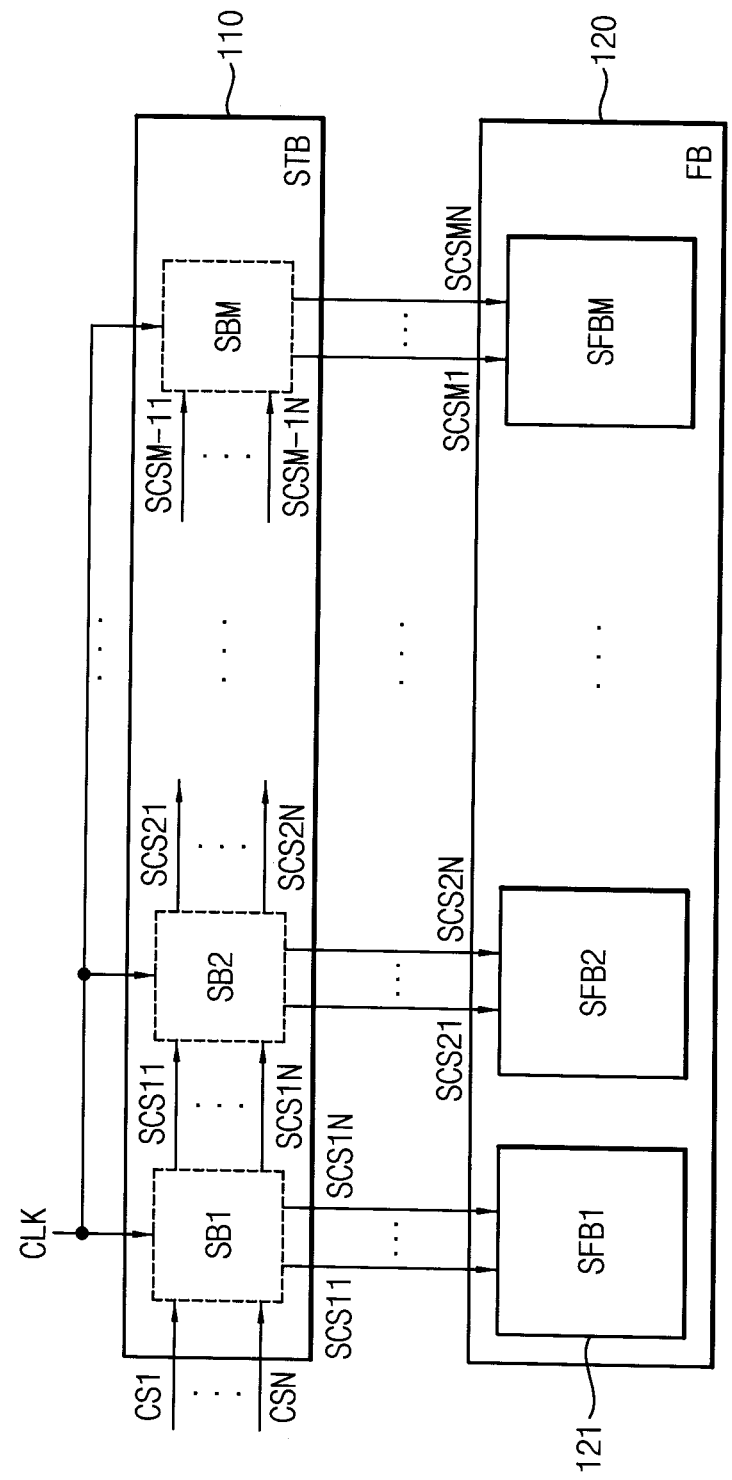
FIG. 1 is a block diagram illustrating an integrated circuit according to an embodiment of the inventive concept.

FIG. 1 is a block diagram illustrating an integrated circuit 100 according to an embodiment of the inventive concept.

Referring to FIG. 1, integrated circuit 100 comprises signal transfer block STB 110 and functional block FB 120.

Signal transfer block 110 is divided into first through (M)-th aligning blocks SB1, SB2, SBM, which provide first aligned control signals SCS11 through SCS1N, second aligned control signals SCS21 through SCS2N, . . . , (M)-th aligned control signals SCSM1 through SCSMN by aligning control signals CS1 through CSN with a clock signal CLK. First through (M)-th aligning blocks SB1, SB2, SBM are connected in a cascade.

Functional block FB is divided into first through (M)-th sub-functional blocks SFB1, SFB2, SFBM each performing the same function in parallel. First through (M)-th sub-functional blocks SFB1, SFB2, SFBM operate based on first aligned control signals SCS11 through SCS1N, second aligned control signals SCS21 through SCS2N, . . . , (M)-th aligned control signals SCSM1 through SCSMN generated by first through (M)-th aligning blocks SB1, SB2, SBM, respectively.

First aligning block SB1 generates first aligned control signals SCS11 through SCS1N by aligning control signals CS1 through CSN with clock signal CLK. Second aligning block SB2 generates second aligned control signals SCS21 through SCS2N by aligning first aligned control signals SCS11 through SCS1N generated by first aligning block SB1. (M)-th aligning block SBM generates (M)-th aligned control signals SCSM1 through SCSMN by aligning the (M−1)-th aligned control signals SCSM-11 through SCSM-1N generated by the (M−1)-th aligning block.

First sub-functional block SFB1 operates according to first aligned control signals SCS11 through SCS1N. Second sub-functional block SFB2 operates according to second aligned control signals SCS21 through SCS2N. (M)-th sub-functional block SFBM operates according to (M)-th aligned control signals SCSM1 through SCSMN. Sub-functional blocks SFB1, SFB2, SFBM perform the same function in parallel.

Figure 2:
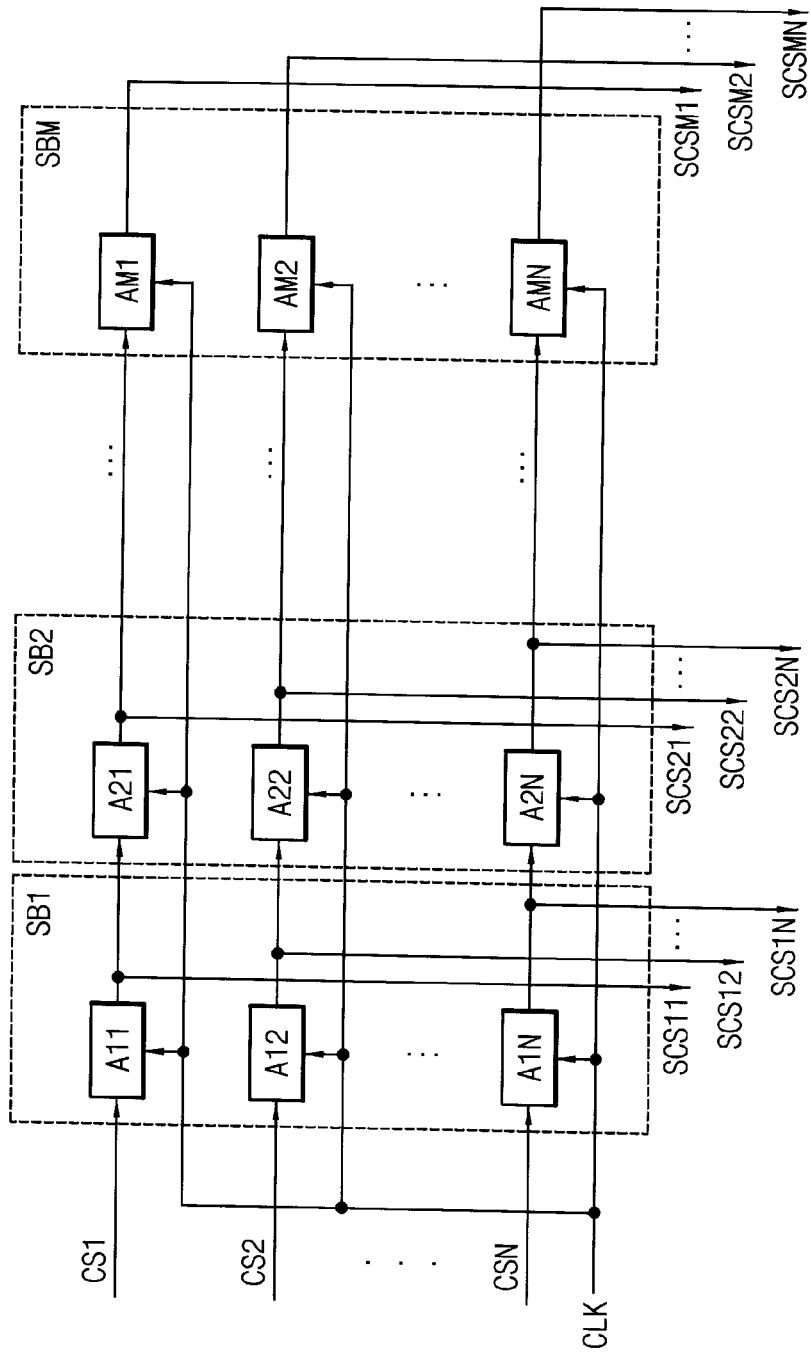
FIG. 2 is a block diagram illustrating a first signal transfer block in the integrated circuit of FIG. 1 according to an embodiment of the inventive concept.
Figure 3:
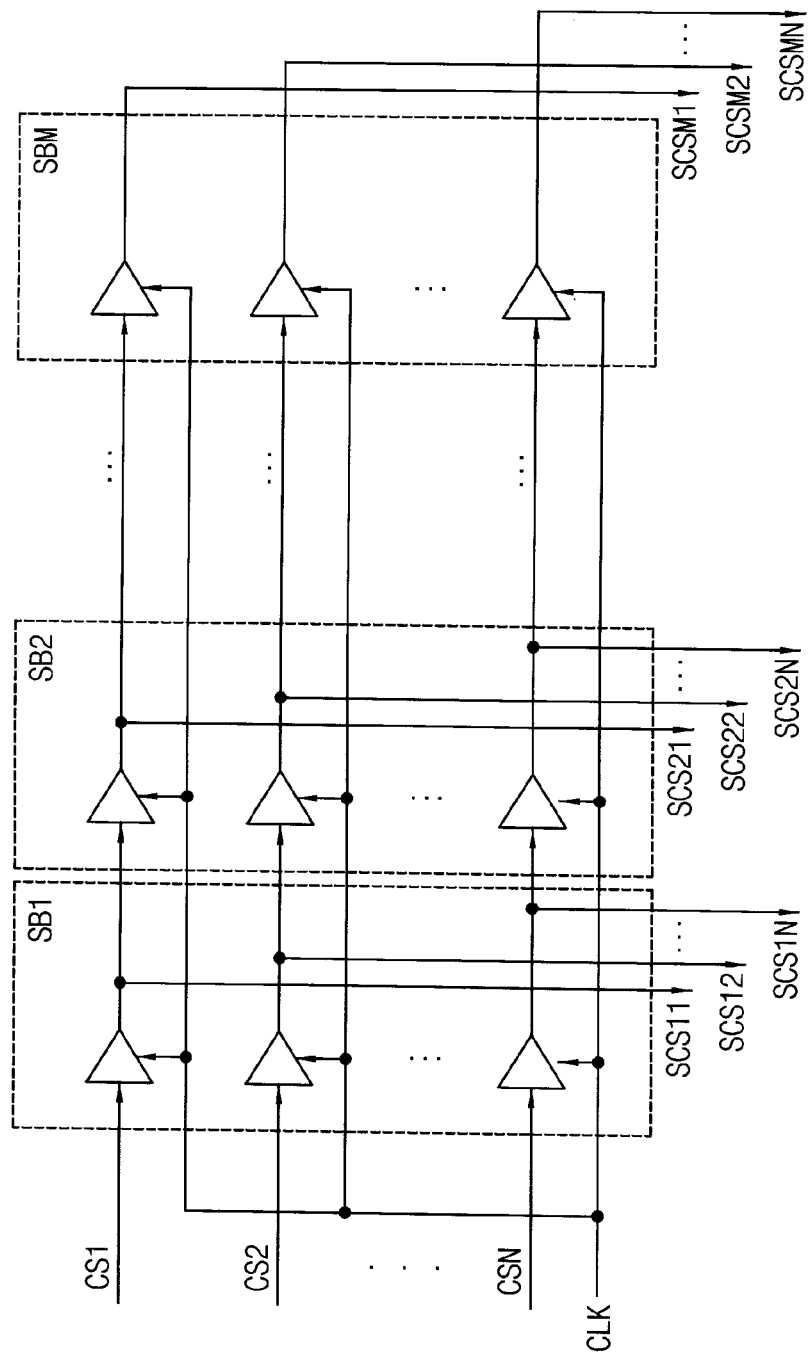
FIG. 3 is a block diagram illustrating a first signal transfer block in the integrated circuit of FIG. 1 according to another embodiment of the inventive concept.
Figure 4:
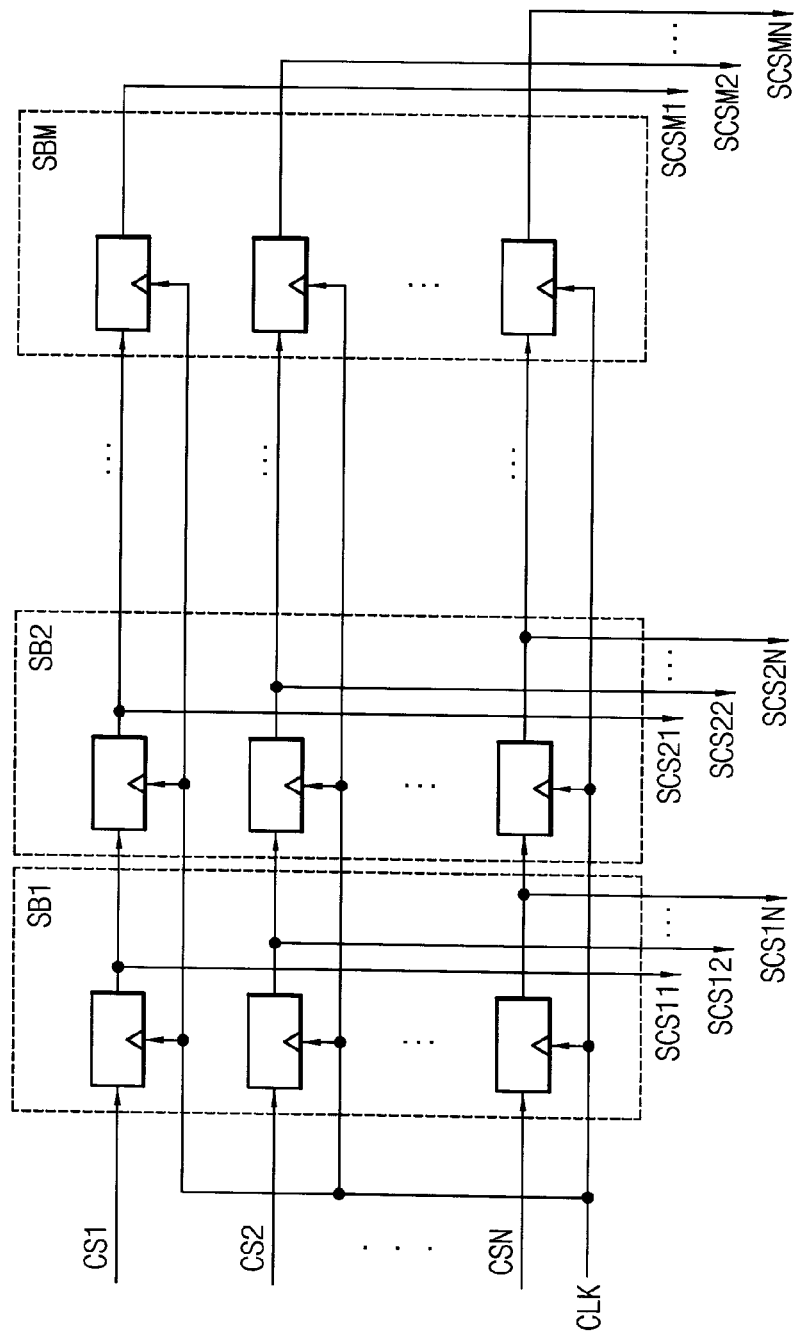
FIG. 4 is a block diagram illustrating a first signal transfer block in the integrated circuit of FIG. 1 according to another embodiment of the inventive concept.

FIGS. 2 through 4 are block diagrams illustrating examples of the first signal transfer block in the integrated circuit of FIG. 1.

Referring to FIG. 2, signal transfer block 110 comprises first through (M)-th aligning blocks SB1, SB2, SBM. First aligning block SB1 comprises first aligners A11, A12, A1N configured to generate first aligned control signals SCS11, SCS12, SCS1N by aligning first control signals CS1, CS2, CSN with clock signal CLK. Second aligning block SB2 comprises second aligners A21, A22, A2N configured to generate second aligned control signals SCS21, SCS22, SCS2N by aligning first aligned control signals SCS11, SCS12, SCS1N with clock signal CLK. (M)-th aligning block SBM comprises (M)-th aligners AM1, AM2, AMN configured to generate the (M)-th aligned control signals SCSM1, SCSM2, SCSMN by aligning the (M−1)-th aligned control signals with clock signal CLK. In general, he (K+1)-th aligning block comprises a (K+1)-th aligners configured to generate the (K+1)-th aligned control signals by aligning the (K)-th aligned control signals with clock signal CLK, where K is an integer greater than zero and smaller than M.

First aligning block SB1 comprises first aligners A11, A12, A1N. Second aligning block SB2 comprises second aligners A21, A22, A2N. (M)-th aligning block SBM comprises the (M)-th aligners AM1, AM2, AMN. For convenience, features that are labeled with indices may be referred to with those indices in parentheses. For instance, first aligner A11 may be referred to as a (1, 1) aligner A11.

The (1, 1) aligner A11 generates the (1, 1) aligned control signal SCS11 by aligning first control signal CS1 with clock signal CLK. The (1, 2) aligner A12 generates the (1, 2) aligned control signal SCS12 by aligning second control signal CS2 with clock signal CLK. The (1, N) aligner A1N generates the (1, N) aligned control signal SCS1N by aligning the (N)-th control signal CSN with clock signal CLK. Other aligners A21, A22, A2N, AM1, AM2, AMN can be understood based on the description of first aligners A11, A12, A1N.

Referring to FIG. 3, each of aligners A11 through AMN in signal transfer block 110 of FIG. 2 may be embodied by a buffer generating an output signal by aligning an input signal with clock signal CLK.

Referring to FIG. 4, each of aligners A11 through AMN in signal transfer block 110 of FIG. 2 may be embodied by a flip-flop which stores an input signal and generates an output signal by aligning the input signal with clock signal CLK.

Figure 5:
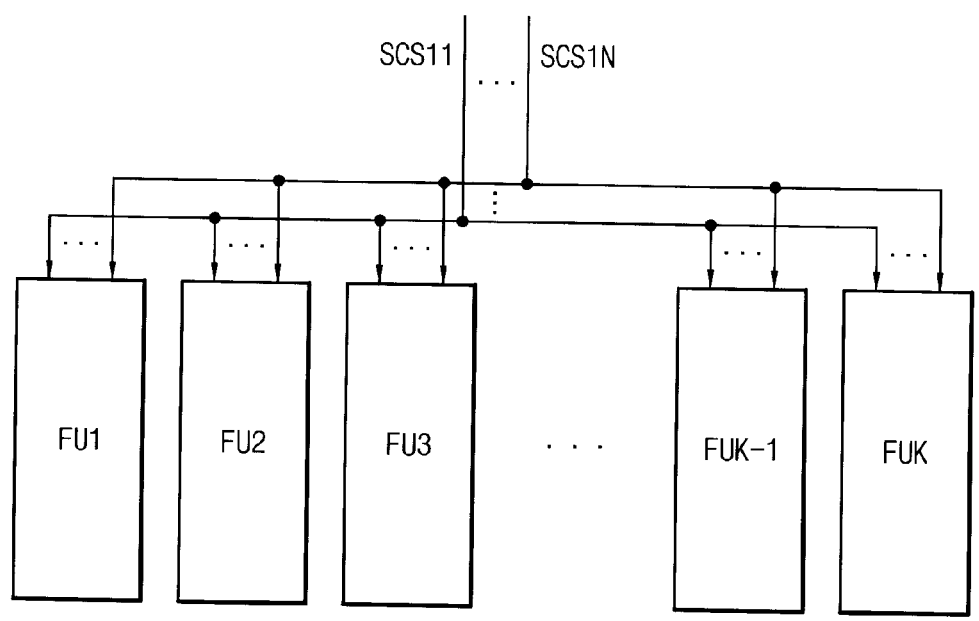
FIG. 5 is a block diagram illustrating a first sub-functional block in the integrated circuit of FIG. 1 according to an embodiment of the inventive concept.

FIG. 5 is a block diagram illustrating a first sub-functional block SFB1 121 in the integrated circuit of FIG. 1 according to an embodiment of the inventive concept.

Referring to FIG. 5, each of the first through the (M)-th sub-functional blocks SFB1, SFB2, SFBM comprises a plurality of functional units performing the same function in parallel based on each of first aligned control signals SCS11 through SCS1N, second aligned control signals SCS21 through SCS2N and the (M)-th aligned control signals SCSM1 through SCSMN. For example, first sub-functional block SFB1 121 comprises a plurality of functional units FU1, FU2, FU3, FUK-1, FUK. Each of functional units FU1, FU2, FU3, FUK-1, FUK performs the same function in parallel based on first aligned control signals SCS11 through SCS1N.

Functional units FU1, FU2, FU3, FUK-1, FUK may be counters configured to convert analog signals corresponding to intensity information of incident light to image sensor into digital signals.

Figure 6:
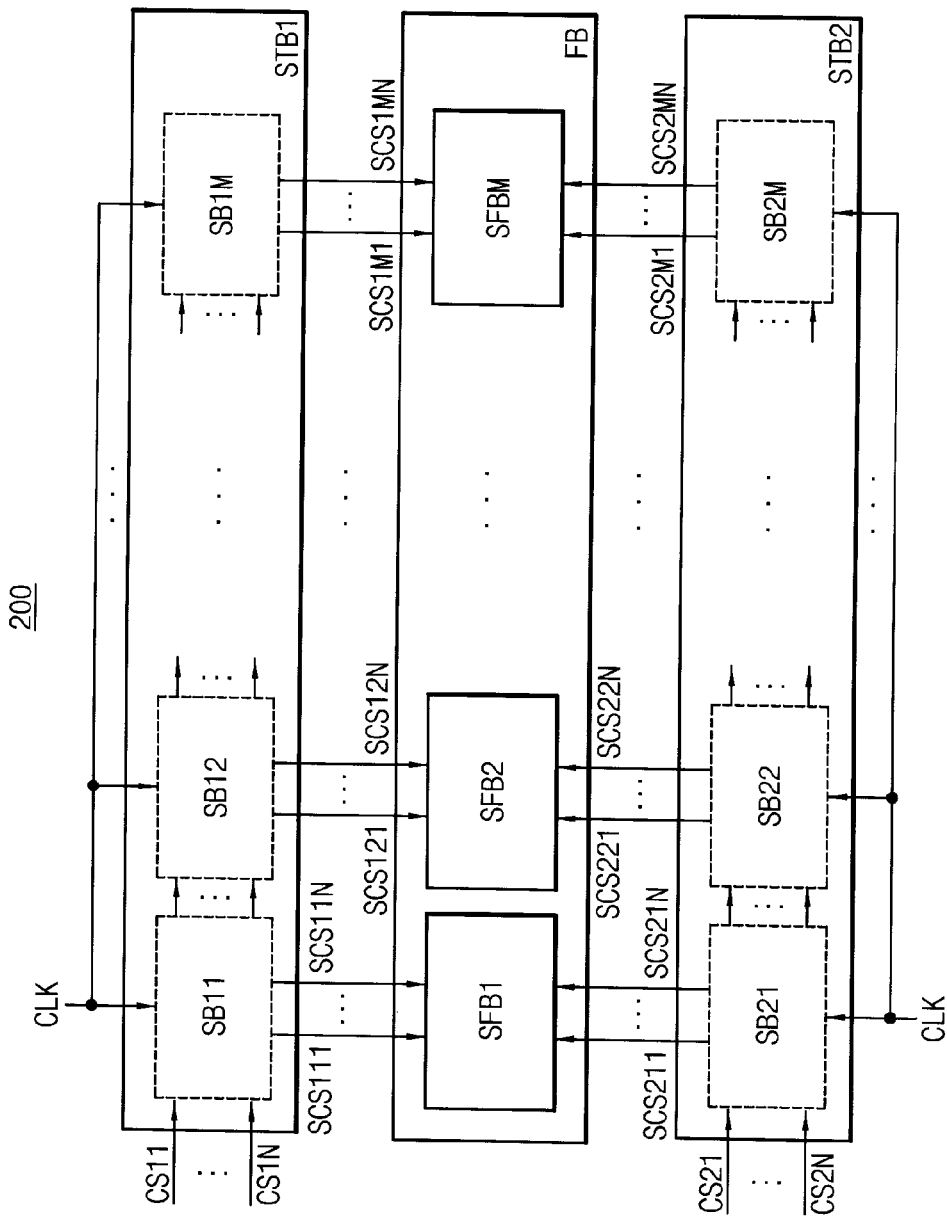
FIG. 6 is a block diagram illustrating an integrated circuit according to an embodiment of the inventive concept.

FIG. 6 is a block diagram illustrating an integrated circuit 200 according to an embodiment of the inventive concept.

Referring to FIG. 6, integrated circuit 200 comprises first signal transfer block STB1, second signal transfer block STB2 and functional block FB.

First signal transfer block STB1 is divided into first through (M)-th aligning blocks SB11, SB12, SB1M providing first aligned control signals SCS111 through SCS11N, second aligned control signals SCS121 through SCS12N through (M)-th aligned control signals SCS1M1 through SCS1MN by aligning first control signals CS11 through CS1N. First through (M)-th aligning blocks SB11, SB12, SB1M are connected in a cascade.

Second signal transfer block STB2 are divided into (M+1)-th through (2M)-th aligning blocks SB21, SB22, SB2M providing (M+1)-th aligned control signals SCS211 through SCS21N, the (M+2)-th aligned control signals SCS221 through SCS22N through the (2M)-th aligned control signals SCS2M1 through SCS2MN. (M+1)-th through the (2M)-th aligning blocks SB21, SB22, SB2M are connected in a cascade.

Functional block FB is divided into a plurality of sub-functional blocks SFB1, SFB2, SFBM. Each of first through (M)-th sub-functional blocks SFB1, SFB2, SFBM operates based on each of first aligned control signals SCS111 through SCS11N, second aligned control signals SCS121 through SCS12N through the (M)-th aligned control signals SCS1M1 through SCS1MN and each of (M+1)-th aligned control signals SCS211 through SCS21N, (M+2)-th aligned control signals SCS221 through SCS22N through (2M)-th aligned control signals SCS2M1 through SCS2MN generated by each of (M+1)-th through (2M)-th aligning blocks SB21, SB22, SB2M respectively.

First sub-functional block SFB1 operates according to first aligned control signals SCS111 through SCS11N and (M+1)-th aligned control signals SCS211 through SCS21N. Second sub-functional block SFB2 operates according to second aligned control signals SCS121 through SCS12N and (M+2)-th aligned control signals SCS221 through SCS22N. (M)-th sub-functional block SFBM operates according to (M)-th aligned control signals SCS1M1 through SCS1MN and (2M)-th aligned control signals SCS2M1 through SCS2MN. Sub-functional blocks SFB1, SFB2, SFBM perform the same function in parallel.

FIG. 6 shows an example where control signals CS11 through CS1N, CS21 through CS2N of integrated circuit 200 are transferred to functional block FB through first signal transfer block STB1 and second signal transfer block STB2 as first aligned control signals SCS111 through SCS11N, second aligned control signals SCS121 through SCS12N through the (M)-th aligned control signals SCS1M1 through SCS1MN, the (M+1)-th aligned control signals SCS211 through SCS21N, the (M+2)-th aligned control signals SCS221 through SCS22N through the (2M)-th aligned control signals SCS2M1 through SCS2MN. In an alternative example, control signals CS11 through CS1N, CS21 through CS2N may be transferred to functional block FB through first signal transfer block STB1 and second signal transfer block STB2 and the additional signal transfer blocks. Each of sub-functional blocks SFB1, SFB2, SFBM may execute own function according to the composition based on each of a plurality of the aligned control signals transferred through first signal transfer block STB1, second signal transfer block STB2 and the additional signal transfer blocks.

Figure 7:
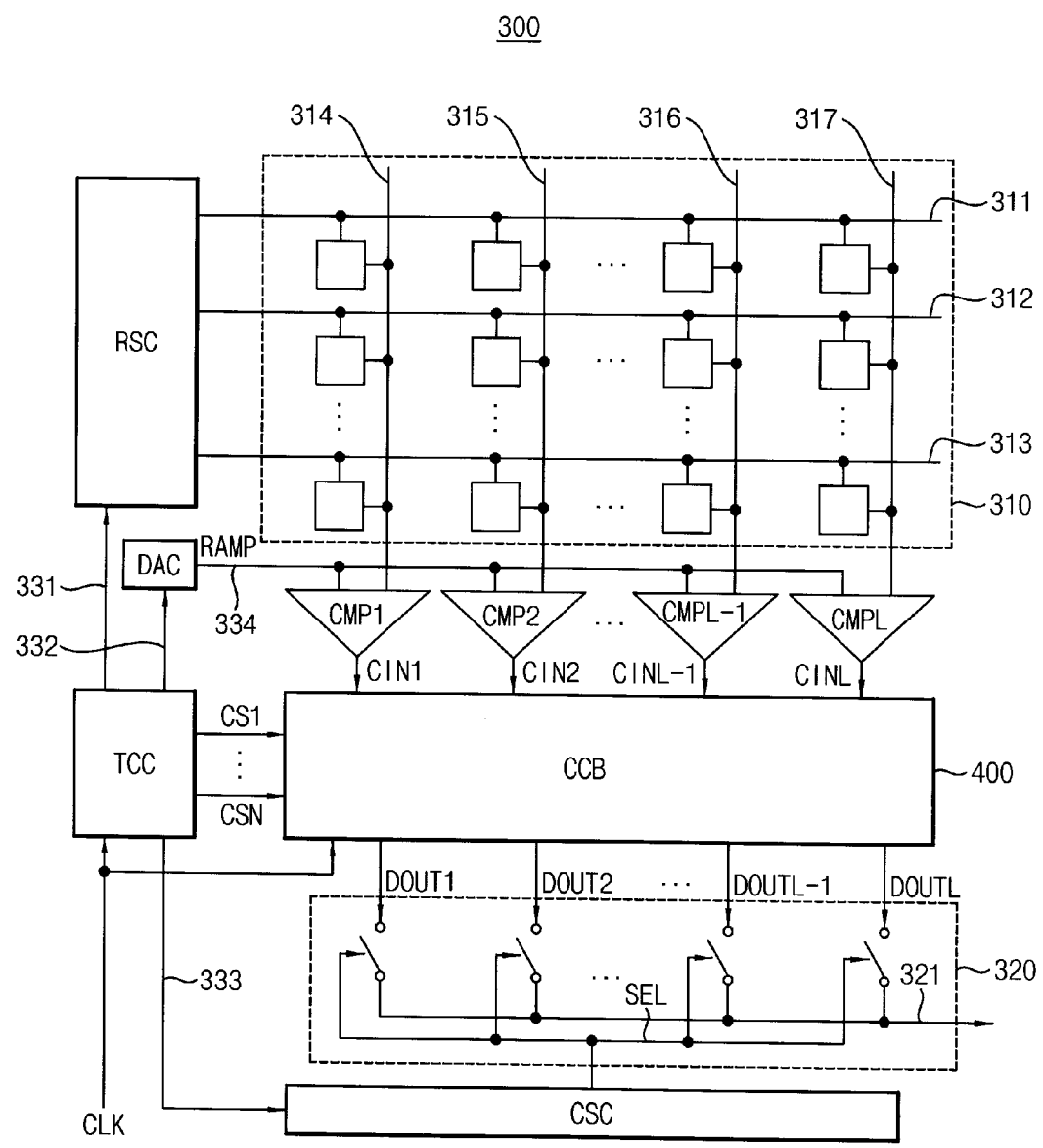
FIG. 7 is a block diagram illustrating an image sensor according to an embodiment of the inventive concept.

FIG. 7 is a block diagram illustrating an image sensor 300 according to an embodiment of the inventive concept.

Referring to FIG. 7, image sensor 300 comprises pixel array 310, comparators CMP1, CMP2, CMPL-1, CMPL, counter circuit block CCB 400, row scan circuit RSC, digital-analog converter DAC, timing control circuit TCC, column scan circuit CSC, data readout circuit 320. Pixel array 310 comprises a plurality of the pixels.

Timing control circuit TCC receives clock signal CLK and generates the row scan circuit control signal 311, digital ramp signal 332 and control signals CS1 through CSN. Row scan circuit RSC selects one of first row line 311, second row line 312 through (N)-th row line 313 in response to row scan circuit control signal 331. Pixel array 310 generates analog signals according to the intensity of the incident light of the selected pixels based a signal on the selected row line. Pixel array 310 transfers the analog signals to comparators CMP1, CMP2, CMPL-1, CMPL through first column line 314, second column line 315, (L−1)-th column line 316 and the (L)-th column line 317. Reference signal generator DAC provides increasing or decreasing ramp signal RAMP to ramp line 334.

First comparator CMP1 compares the first analog signal transferred through first column line 314 and ramp signal RAMP on ramp line 334. If the first analog signal is equal to ramp signal RAMP or smaller than ramp signal RAMP, first comparator CMP1 outputs logical high value as first compared result signal CIN1. Otherwise, first comparator CMP1 outputs logical low value as first compared result signal CIN1. Other comparators CMP2, CMPL-1, CMPL may be understood based on the description about first comparator CMP1. In an example embodiment, the logical high value may have logical value 1 and the logical low value may have logical value 0 complementarily. In another example embodiment, the logical high value may have logical value 0 and the logical low value may have logical value 1 complementarily.

Counter circuit block 400 will be described with the reference to FIG. 8.

Data read out circuit 320 selects a column in response to switch control signal SEL generated by row scan circuit CSC based on the row scan circuit control signal 333. Data read out circuit 320 outputs a digital output signal according to the selected column among digital output signals DOUT1, DOUT2, DOUTL-1, DOUTL which correspond to the analog signals and are generated by the counters in counter circuit block CCB through common output line 321.

Figure 8:
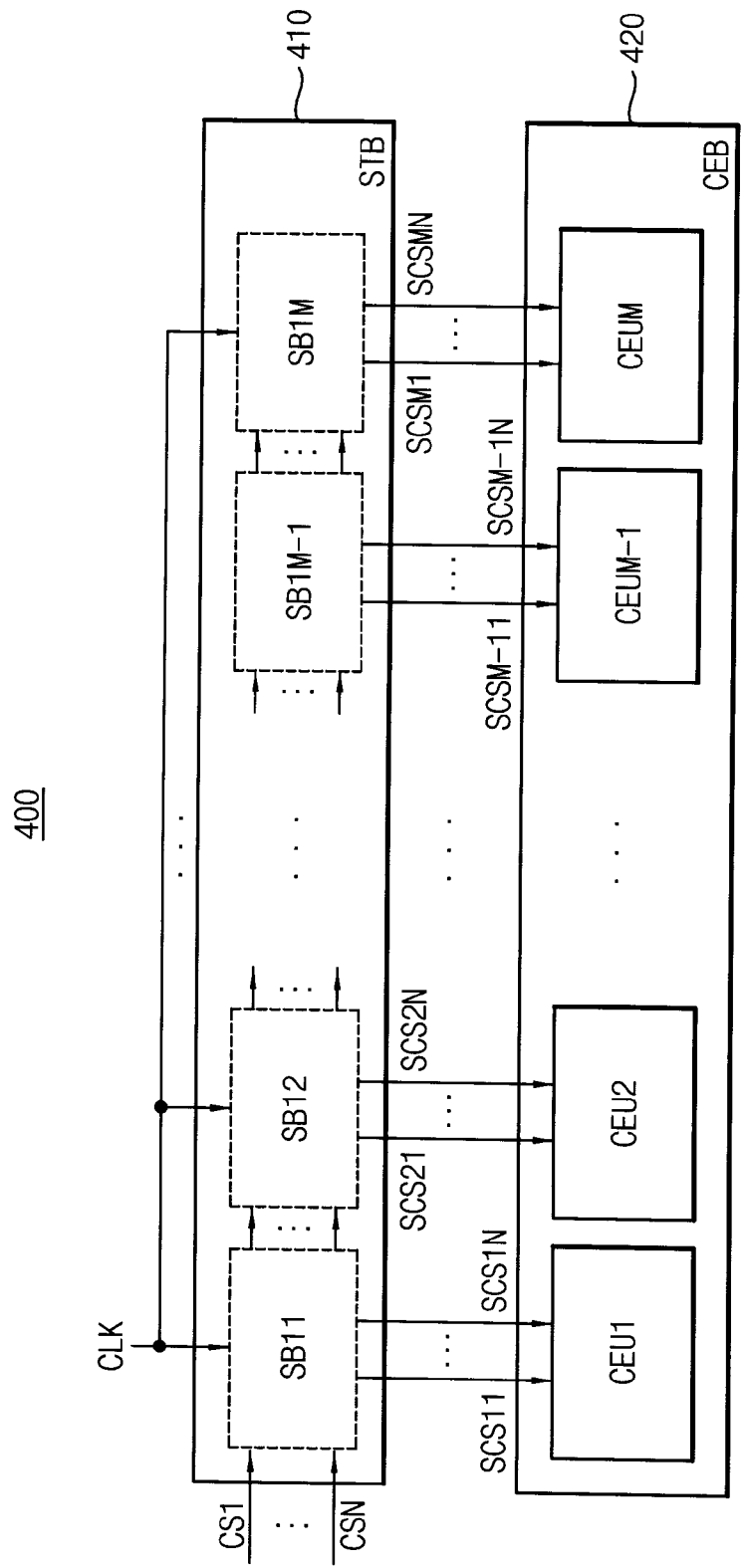
FIG. 8 is a block diagram illustrating a counter circuit block in the image sensor of FIG. 7 according to an embodiment of the inventive concept.

FIG. 8 is a block diagram illustrating the counter circuit block in the image sensor of FIG. 7 according to an embodiment of the inventive concept.

Referring to FIG. 8, counter circuit block 400 of FIG. 7 comprises signal transfer block STB 410 and count executing block CEB 420. Signal transfer block STB is divided into first through (M)-th aligning blocks SB11, SB12, SB1M-1, SB1M providing first aligned control signals SCS11 through SCS1N, second aligned control signals SCS21 through SCS2N through (M−1)-th aligned control signals SCSM-11 through SCSM-1N and (M)-th aligned control signals SCSM1 through SCSMN by aligning control signals CS1 through CSN with clock signal CLK. First through (M)-th aligning blocks SB11, SB12, SB1M-1, SB1M are connected in a cascade Count executing block CEB is divided into first through (M)-th count executing units CEU1, CEU2, CEUM-1, CEUM performing the same counting function in parallel. Each of first through (M)-th count executing units CEU1, CEU2, CEUM-1, CEUM operates based on compared result signals CIN1, CIN2, CINL-1, CINL and each of first aligned control signals SCS11 through SCS1N, second aligned control signals SCS21 through SCS2N through (M−1)-th aligned control signals SCSM-11 through SCSM-1N and (M)-th aligned control signals SCSM1 through SCSMN generated by each of the first through (M)-th aligning blocks SB11, SB12, SB1M-1, SB1M respectively.

Signal transfer block STB is described with the reference to FIG. 1.

First count executing unit CEU1 performs a counting function based on first aligned control signals SCS11 through SCS1N. Second count executing unit CEU2 performs a counting function based on the second aligned control signals SCS21 through SCS2N. (M−1)-th count executing unit CEUM-1 performs a counting function based on the (M−1)-th aligned control signals SCSM-11 through SCSM-1N. (M)-th count executing unit CEUM performs a counting function based on the (M)-th aligned control signals SCSM1 through SCSMN. Count executing units CEU1, CEU2, CEUM-1, CEUM perform a same counting function in parallel.

Each of comparators CMP1, CMP2, CMPL-1, CMPL in image sensor 300 of FIG. 7 and each of the switches in data readout circuit 320 may operate based on each of the first aligned control signals SCS11 through SCS1N, the second aligned control signals SCS21 through SCS2N through the (M−1)-th aligned control signals SCSM-11 through SCSM-1N and the (M)-th aligned control signals SCSM1 through SCSMN respectively.

Figure 9:
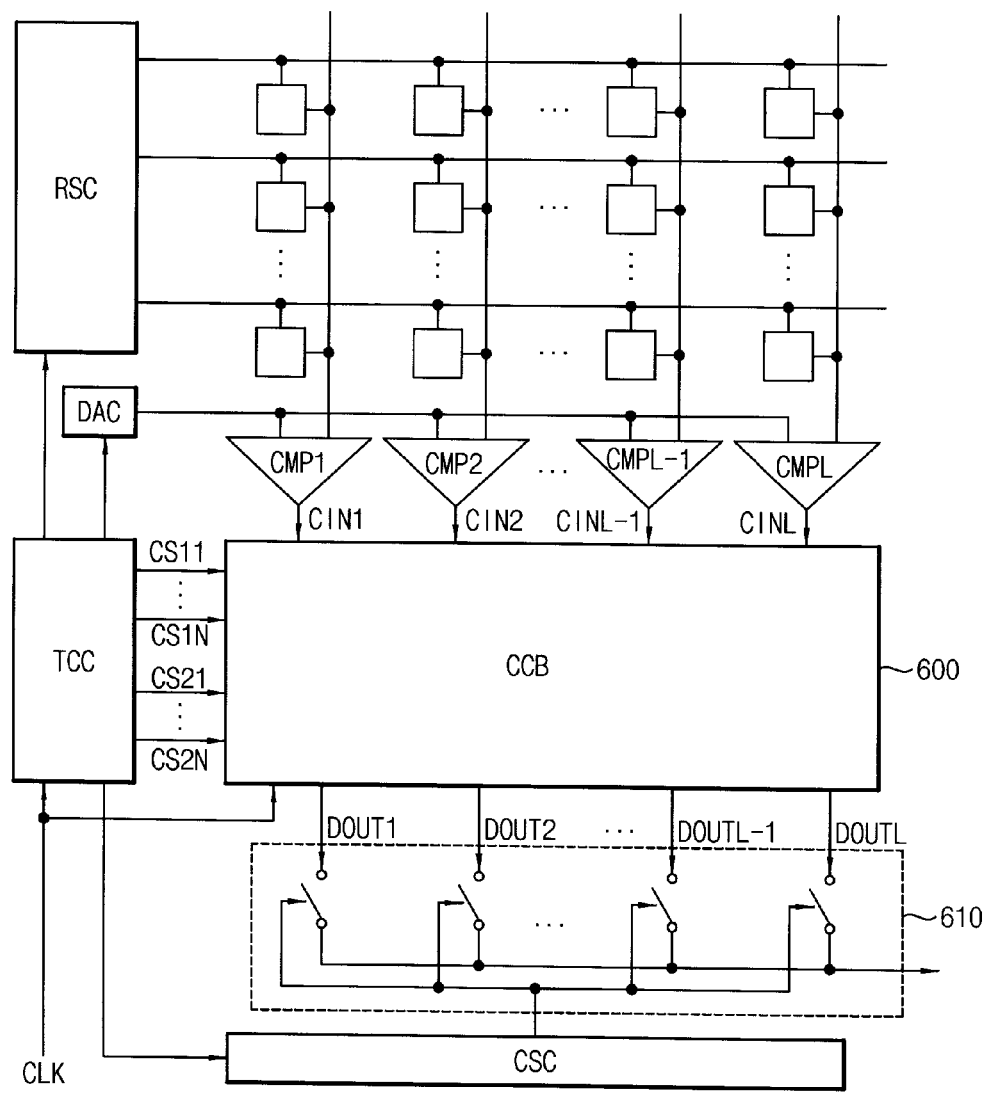
FIG. 9 is a block diagram illustrating an image sensor according to an embodiment of the inventive concept.

FIG. 9 a block diagram illustrating an image sensor according to an embodiment of the inventive concept.

Referring to FIG. 9, image sensor 500 has the same structure as image sensor 300 of FIG. 7, except that timing control circuit TCC is modified and counter circuit block 600 is included instead of counter circuit block 400.

Timing control circuit TCC receives clock signal CLK and generates first control signals CS11 through CS1N and second control signals CS21 through CS2N. Counter circuit block 600 outputs digital output signals DOUT1, DOUT2, DOUTL-1, DOUTL according to the compared result signals CIN1, CIN2, CINL-1, CINL based on clock signal CLK, the compared result signals CIN1, CIN2, CINL-1, CINL and first control signals CS11 through CS1N and second control signals CS21 through CS2N generated by timing control circuit TCC.

Counter circuit block 600 will be described with the reference to FIG. 10.

Figure 10:
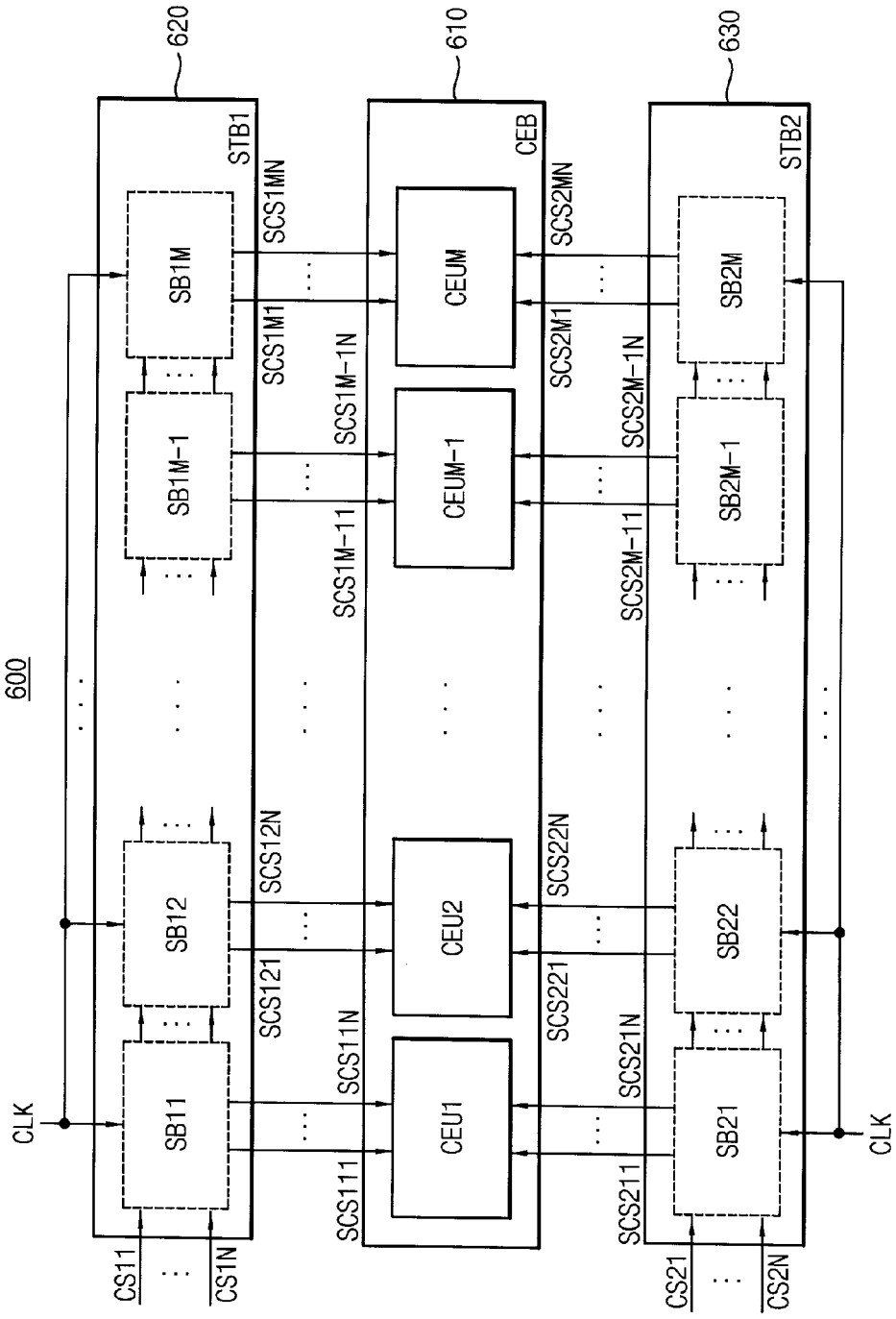
FIG. 10 is a block diagram illustrating a counter circuit block in the image sensor of FIG. 9 according to an embodiment of the inventive concept.

FIG. 10 is a block diagram illustrating the counter circuit block in the image sensor of FIG. 9 according to an embodiment of the inventive concept.

Referring to FIG. 10, counter circuit block 600 comprises first signal transfer block 620, second signal transfer block 630 and count executing block 610.

First signal transfer block STB1 is divided into first through (M)-th aligning blocks SB11, SB12, SB1M-1, SB1M providing the first aligned control signals SCS111 through SCS11N, second aligned control signals SCS121 through SCS12N through the (M−1)-th aligned control signals SCS1M-11 through SCS1M-1N and the (M)-th aligned control signals SCS1M1 through SCS1MN by aligning first control signals CS11 through CS1N. First through (M)-th aligning blocks SB11, SB12, SB1M-1, SB1M are connected in a cascade.

Second signal transfer block STB2 is divided into (M+1)-th through (2M)-th aligning blocks SB21, SB22, SB2M-1, SB2M providing (M+1)-th aligned control signals SCS211 through SCS21N, (M+2)-th aligned control signals SCS221 through SCS22N through (2M−1)-th aligned control signals SCS2M-11 through SCS2M-1N and the (2M)-th aligned control signals SCS2M1 through SCS2MN. (M+1)-th through (2M)-th aligning blocks SB21, SB22, SB2M-1, SB2M are connected in a cascade.

First through the (M)-th count executing units CEU1, CEU2, CEUM-1, CEUM operate based on first aligned control signals SCS111 through SCS11N, second aligned control signals SCS121 through SCS12N through (M−1)-th aligned control signals SCS1M-11 through SCS1M-1N and (M)-th aligned control signals SCS1M1 through SCS1MN and each of the (M+1)-th aligned control signals SCS211 through SCS21N, (M+2)-th aligned control signals SCS221 through SCS22N through (2M−1)-th aligned control signals SCS2M-11 through SCS2M-1N and (2M)-th aligned control signals SCS2M1 through SCS2MN generated by each of the (M+1)-th through (2M)-th aligning blocks SB21, SB22, SB2M-1, SB2M.

First count executing unit CEU1 executes the counting function based on first aligned control signals SCS111 through SCS11N and (M+1)-th aligned control signal SCS211 through SCS21N. Other count executing units CEU2, CEUM-1, CEUM may be understood based on the description about first count executing unit CEU1.

FIG. 10 shows an example where control signals CS11 through CS1N, CS21 through CS2N of counter circuit block 600 are transferred to count executing block CEB through first signal transfer block STB1 and second signal transfer block STB2 as first aligned control signals SCS111 through SCS11N, second aligned control signals SCS121 through SCS12N through M−1 the aligned control signals SCS1M-11 through SCS1M-1N and the (M)-th aligned control signals SCS1M1 through SCS1MN, (M+1)-th aligned control signals SCS211 through SCS21N, (M+2)-th aligned control signals SCS221 through SCS22N through (2M−1)-th aligned control signals SCS2M-11 through SCS2M-1N and (2M)-th aligned control signals SCS2M1 through SCS2MN. In an alternative example, control signals CS11 through CS1N, CS21 through CS2N may be transferred to count executing block CEB through first signal transfer block STB1 and second signal transfer block STB2 and the additional signal transfer blocks. Each of first through (M)- th count executing units CEU1, CEU2, CEUM-1, CEUM may perform a counting function based on each of a plurality of the aligned control signals transferred through first signal transfer block STB1, second signal transfer block STB2 and the additional signal transfer blocks.

Each of the comparators in image sensor 500 of FIG. 9 and each of the switches in the data readout circuit may operate based on each of first aligned control signals SCS111 through SCS11N, second aligned control signals SCS121 through SCS12N through (M−1)-th aligned control signals SCS1M-11 through SCS1M-1N and (M)-th aligned control signals SCS1M1 through SCS1MN and each of (M+1)-th aligned control signals SCS211 through SCS21N, (M+2)-th aligned control signals SCS221 through SCS22N through the (2M−1)-th aligned control signals SCS2M-11 through SCS2M-1N and (2M)-th aligned control signals SCS2M1 through SCS2MN respectively.

Figure 11:
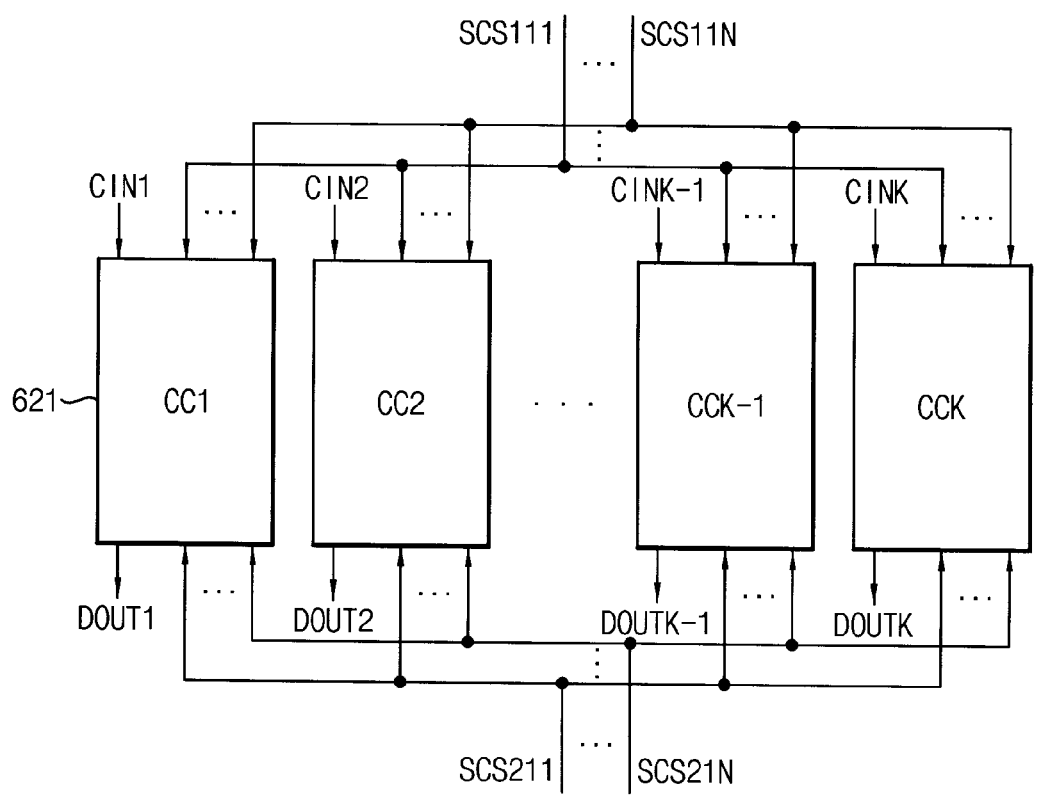
FIG. 11 is a block diagram illustrating a first count executing unit in the counter circuit block of FIG. 10 according to an embodiment of the inventive concept.

FIG. 11 is a block diagram illustrating the first count executing unit in the counter circuit block of FIG. 10 according to an embodiment of the inventive concept.

Referring to FIG. 11, each of first through (M)-th count executing units CEU1, CEU2, CEUM-1, CEUM comprises a plurality of counters performing a same counting function in parallel based on each of first aligned control signals SCS111 through SCS11N, second aligned control signals SCS121 through SCS12N through (M−1)-th aligned control signals SCS1M-11 through SCS1M-1N and (M)-th aligned control signals SCS1M1 through SCS1MN and each of (M+1)-th aligned control signals SCS211 through SCS21N, (M+2)-th aligned control signals SCS221 through SCS22N through (2M−1)-th aligned control signals SCS2M-11 through SCS2M-1N and the (2M)-th aligned control signals SCS2M1 through SCS2MN corresponding to each of first aligned control signals SCS111 through SCS11N, second aligned control signals SCS121 through SCS12N through the (M−1)-th aligned control signals SCS1M-11 through SCS1M-1N and (M)-th aligned control signals SCS1M1 through SCS1MN.

First count executing unit CEU1 comprises counters CC1 (621), CC2, CCK-1, CCK outputting digital output signals DOUT1, DOUT2, DOUTK-1, DOUTK respectively. Other count executing units CEU2, CEUM-1, CEUM may be understood based on the description about the first count executing unit CEU1.

Figure 12:
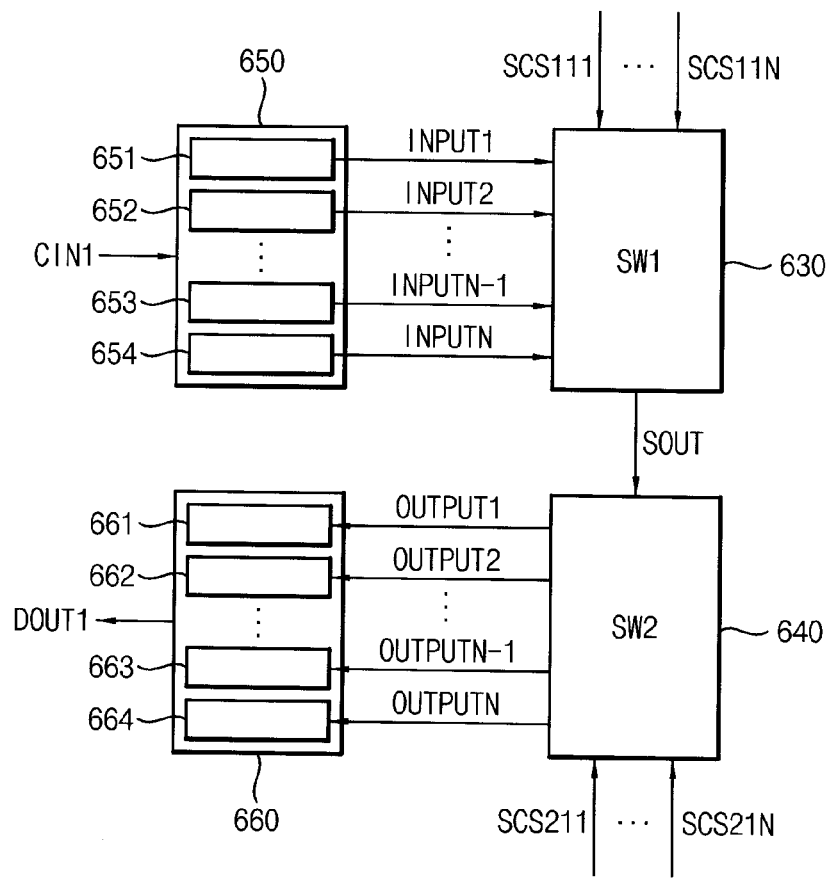
FIG. 12 is a block diagram illustrating a first counter in the first count executing unit of FIG. 11 according to an embodiment of the inventive concept.

FIG. 12 is a block diagram illustrating the first counter in the first count executing unit of FIG. 11 according to an embodiment of the inventive concept.

Referring to FIG. 12, each of first through (M)-th count executing units CEU1, CEU2, . . . , CEUM-1, CEUM comprises a plurality of counters CC1, CC2, . . . , CCK-1, CCK. First counter CC1 comprises a counting part 650, a first switch SW1 630, a second switch SW2 640 and a memory unit 660. Counting part 650 may output a counting value of edges of a counter input signal CIN1 as switch input signals INPUT1, INPUT2, . . . , INPUTN-1, INPUTN. First switch 630 may output a portion of switch input signals INPUT1, INPUT2, . . . , INPUTN-1, INPUTN as a first switch output signal SOUT. Second switch 640 may output first switch output signal SOUT as a portion of second switch output signals OUTPUT1, OUTPUT2, . . . , OUTPUTN-1, OUTPUTN. Memory unit 660 may store the second switch output signals OUTPUT1, OUTPUT2, . . . , OUTPUTN-1, OUTPUTN, output the stored second switch output signals OUTPUT1, OUTPUT2, . . . , OUTPUTN-1, OUTPUTN as a memory output signal DOUT1 sequentially.

The first switch in each of the first through (M)-th count executing units CEU1, CEU2, . . . , CEUM-1, CEUM in counter circuit block 600 of FIG. 10 may operate based on each of the first aligned control signals SCS111 through SCS11N through the (M)-th aligned control signals SCS1M1 through SCS1MN.

The second switch in each of the first through (M)-th count executing units CEU1, CEU2, . . . , CEUM-1, CEUM in counter circuit block 600 of FIG. 10 may operate based on each of the (M+1)-th aligned control signals SCS211 through SCS21N through the (M+2)-th aligned control signals SCS2M1 through SCS2MN corresponding to each of the first aligned control signals SCS111 through SCS11N through the (M)-th aligned control signals SCS1M1 through SCS1MN respectively.

Counting part 650 comprises bit counters 651 through 654. Memory unit 660 comprises bit memories 661 through 664. Bit counters 651 store bits of a counting value of edges of a counter input signal CIN1. Bit counters 651 output the bits as switch input signals INPUT1, INPUT2, . . . , INPUTN-1, INPUTN. First switch SW1 outputs a portion of switch input signals INPUT1, INPUT2, . . . , INPUTN-1, INPUTN as a first switch output signal SOUT based on the first aligned control signals SCS111 through SCS111N. Second switch SW2 outputs the first switch output signal SOUT as a portion of the second switch output signals OUTPUT1 through OUTPUTN based on the (M+1)-th aligned control signals SCS211 through SCS21N. Bit memories 661 through 664 stores the second switch output signals OUTPUT1 through OUTPUTN. Memory unit 660 outputs the stored second switch output signals OUTPUT1 through OUTPUTN as memory output signals DOUT1 sequentially.

Figure 13A:
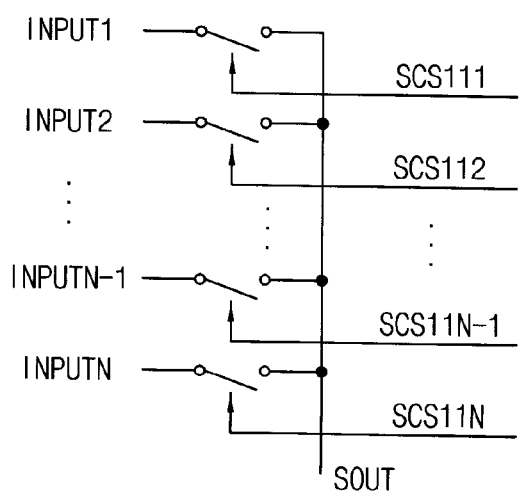
FIG. 13A is a block diagram illustrating a first switch in the counter of FIG. 12 according to an embodiment of the inventive concept.
Figure 13B:
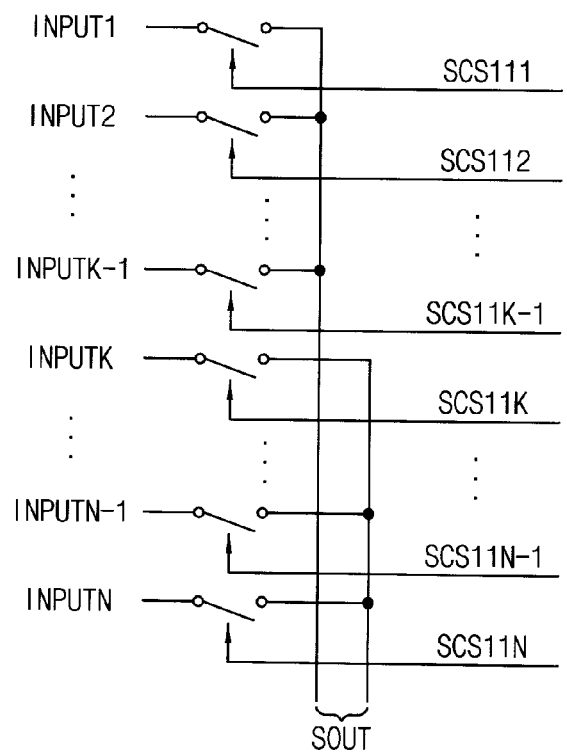
FIG. 13B is a block diagram illustrating a first switch in the counter of FIG. 12 according to another embodiment of the inventive concept.
Figure 13C:
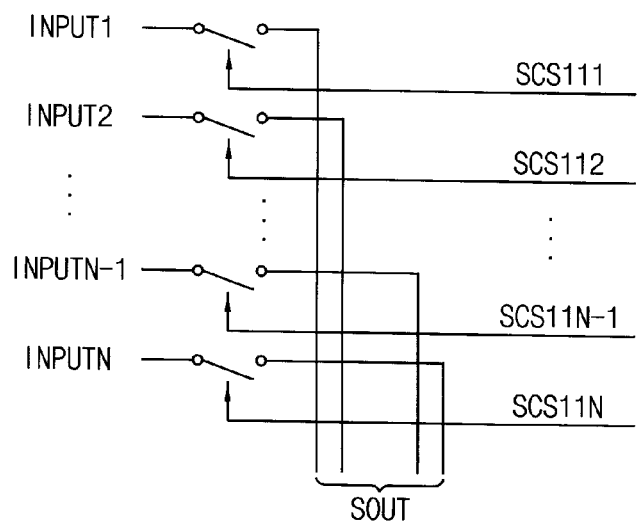
FIG. 13C is a block diagram illustrating a first switch in the counter of FIG. 12 according to another embodiment of the inventive concept.

FIGS. 13A through 13C are block diagrams illustrating examples of the first switch in the counter of FIG. 12.

Referring to FIG. 13A, first switch 630a outputs one of switch input signals INPUT1 through INPUTN as the first switch output signal SOUT based on the first aligned control signals SCS111 through SCCS11N. First switch output signal SOUT may be one bit signal.

Referring to FIG. 13B, first switch output signal SOUT may be a two bit signal comprising an upper bit signal and a lower bit signal. First switch 630b outputs one of a portion of switch input signals INPUT1 through INPUTK-1 as the lower bit signal based on a portion of the first aligned control signals SCS111 through SCS11K-1. First switch 630b outputs one of another portion of switch input signals INPUTK through INPUTN as the upper bit signal based on another portion of the first aligned control signals SCS11K through SCS11N.

Referring to FIG. 13C, first switch 630c outputs each of switch input signals INPUT1 through INPUTN as each of the bits of the first switch output signal SOUT based on each of the first aligned control signals SCS111 through SCS11N.

Figure 14A:
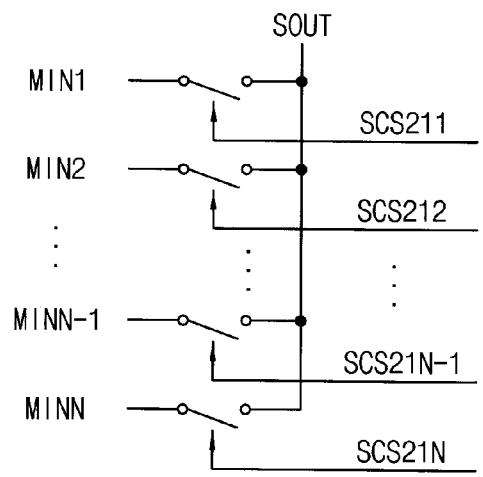
FIG. 14A is a block diagram illustrating a second switch in the counter of FIG. 12 according to an embodiment of the inventive concept.
Figure 14B:
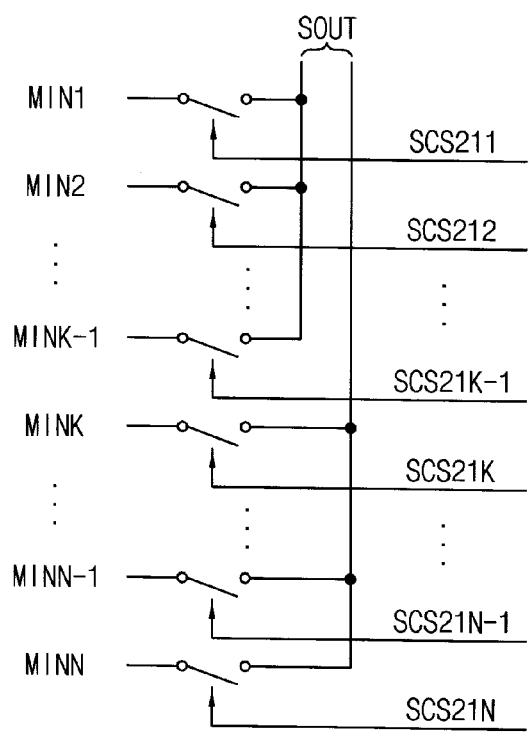
FIG. 14B is a block diagram illustrating a second switch in the counter of FIG. 12 according to another embodiment of the inventive concept.
Figure 14C:
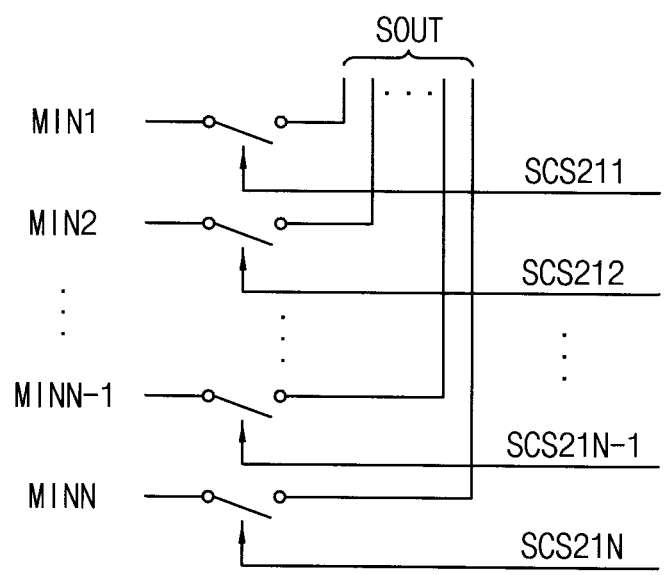
FIG. 14C is a block diagram illustrating a second switch in the counter of FIG. 12 according to an embodiment of the inventive concept.

FIGS. 14A through 14C are block diagrams illustrating examples of the second switch in the counter of FIG. 12.

Referring to FIG. 14A, second switch 640a outputs first switch output signal SOUT as one of memory input signals MIN1 through MINN based on the (M+1)-th aligned control signals SCS211 through SCS21N. First switch output signal SOUT may be one bit signal. The outputted signal may be stored in memory unit 660 in first counter 621 of FIG. 12.

Referring to FIG. 14B, first switch output signal SOUT may be a two bit signal comprising an upper bit signal and a lower bit signal. Second switch 640b outputs the lower bit signal as a first signal which is one of a portion of memory input signals MIN1 through MINK-1 based on a portion of the (M+1)-th aligned control signals SCS211 through SCS21K-1. Second switch 640b outputs the upper bit signal as a second signal which is one of another portion of memory input signals MINK through MINN based on another portion of the (M+1)-th aligned control signals SCS21K through SCS21N. The first signal and the second signal may be stored in memory unit 660 in first counter 621 of FIG. 12.

Referring to FIG. 14C, second switch 640c outputs each of the bits of the first switch output signal SOUT as each of memory input signals MIN1 through MINN based on each of the (M+1)-th aligned control signals SCS211 through SCS21N. The memory input signals MIN1 through MINN may be stored in memory unit 660 in first counter 621 of FIG. 12.

Figure 15:
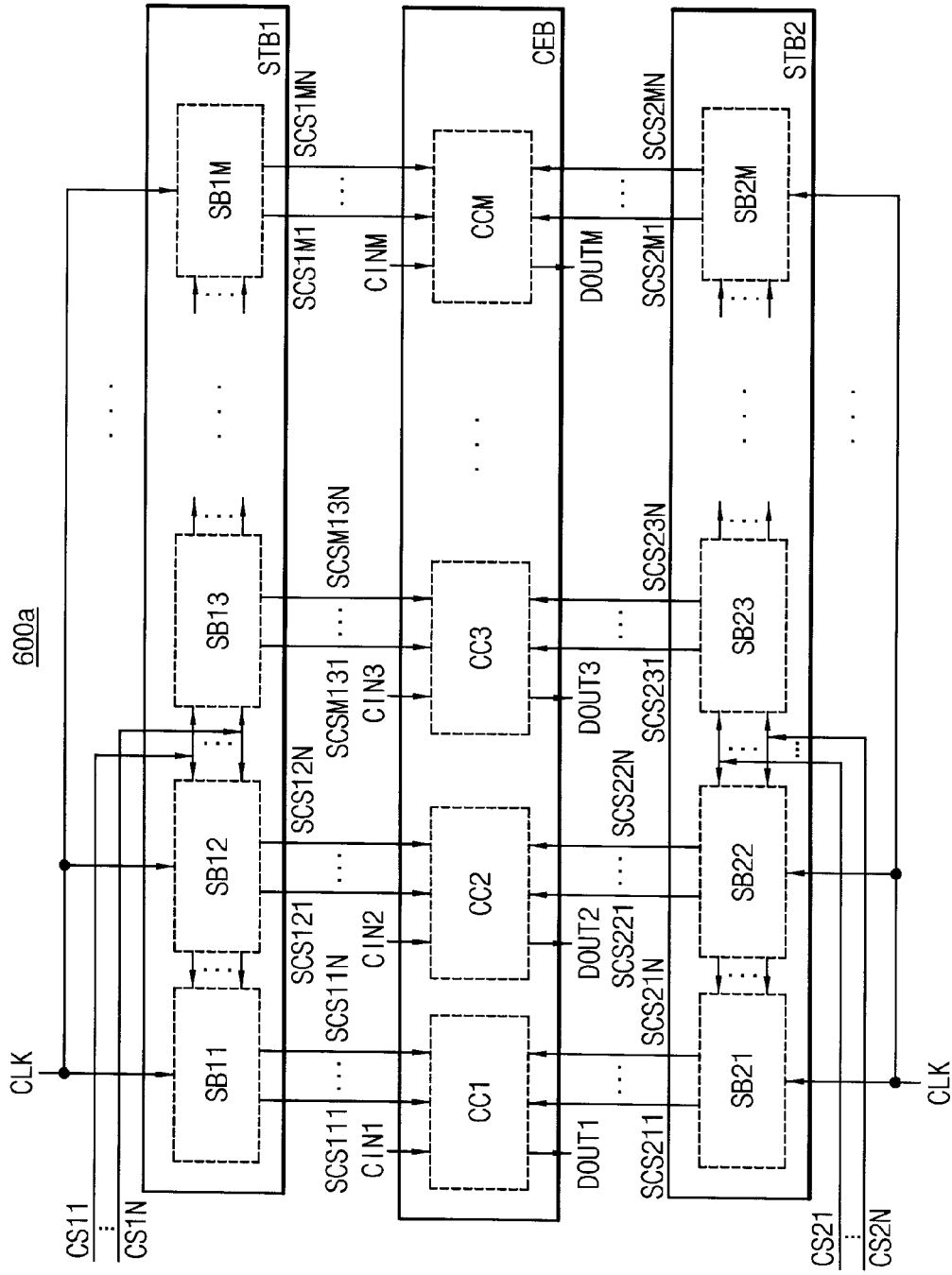
FIG. 15 is a block diagram illustrating a counter circuit block in the image sensor of FIG. 9 according to an embodiment of the inventive concept.

FIG. 15 is a block diagram illustrating the counter circuit block in the image sensor of FIG. 9 according to an embodiment of the inventive concept.

Referring to FIG. 15, counter circuit block 600a has the same structure as counter circuit block 600 of FIG. 10, except for a location where first control signals CS11 through CS1N are provided to first signal transfer block STB1 and a location where second control signals CS21 through CS2N are provided to the second signal transfer block STB2.

First control signals CS11 through CS1N may be provided between second aligning block SB12 and third aligning block SB13. Second control signals CS21 through CS2N may be provided between the (M+2)-th aligning block SB22 and the (M+3)-th aligning block SB23.

In some embodiments, second aligned control signals SCS121 through SCS12N may be transferred from second aligning block SB12 to first aligning block SB11. Second aligned control signals SCS121 through SCS12N may be transferred from second aligning block SB12 to third aligning block SB13 through the (M)-th aligning block SB1M.

(M+2)-th aligned control signals SCS221 through SCS22N may be transferred from (M+2)-th aligning block SB12 to (M+1)-th aligning block SB11. (M+2)-th aligned control signals SCS221 through SCS22N may be transferred from (M+2)-th aligning block SB22 to (M+3)-th aligning block SB23 through (2M)-th aligning block SB2M.

First control signals CS11 through CS1N may be provided to anywhere among first through the (M)-th aligning blocks SB11 through SB1M. First control signals CS11 through CS1N may be transferred to first aligning block SB11 and the (M)-th aligning block SB1M.

Second control signals CS21 through CS2N may be provided to anywhere among (M30 1)-th through (2M)-th aligning blocks SB21 through SB2M. Second control signals CS21 through CS2N may be transferred to the (M+1)-th aligning block SB21 and the (2M)-th aligning block SB2M.

Each of the comparators in image sensor 500 of FIG. 9 and each of the switches in the data readout circuit may operate based on each of first aligned control signals SCS111 through SCS11N through (M)-th aligned control signals SCS1M1 through SCS1MN and each of (M+1)-th aligned control signals SCS211 through SCS21N through (2M)-th aligned control signals SCS2M1 through SCS2MN respectively.

Figure 16:
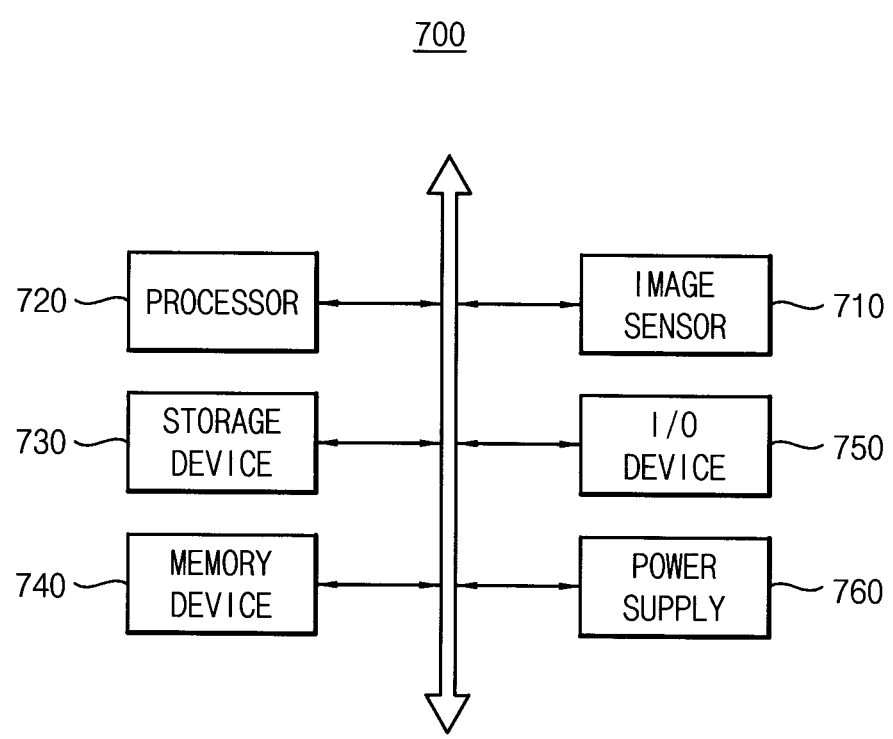
FIG. 16 is a block diagram illustrating a computing system according to an embodiment of the inventive concept.

FIG. 16 is a block diagram illustrating a computing system 700 according to an embodiment of the inventive concept.

Referring to FIG. 16, computing system 700 comprises an image sensor 710, a processor 720 and a storage device 730.

Image sensor 710 generates a digital signal corresponding to incident light, and storage device 730 stores the digital signal. Processor 720 controls operations of image sensor 710 and storage device 730.

Computing system 700 further comprises a memory device 740, an input/output device 750 and a power supply 760. Although not illustrated in FIG. 16, computing system 700 may further comprise ports that communicate with a video card, a sound card, a memory card, a universal serial bus (USB) device, or other electronic devices.

Processor 720 may perform various calculations or tasks. According to some embodiments, processor 720 may be a microprocessor or a CPU. Processor 720 may communicate with storage device 730, memory device 740 and input/output device 750 via an address bus, a control bus, and/or a data bus. In some example embodiments, processor 720 may be coupled to an extended bus, such as a peripheral component interconnection (PCI) bus.

Storage device 730 may comprise a non-volatile memory device such as a flash memory device, a solid state drive (SSD), a hard disk drive (HDD), or a compact disk read-only memory (CD-ROM) drive, for example.

Memory device 740 may store data required for an operation of electronic device 700. Memory device 740 may be a dynamic random access memory (DRAM), a static random access memory (SRAM), or a non-volatile memory, such as an erasable programmable read-only memory (EPROM), an electrically erasable programmable read-only memory (EEPROM), or a flash memory, for example.

Input/output device 750 be a keyboard, a mouse, a printer, or a display device, for example. Power supply 760 may supply operational power.

Image sensor 710 may be connected to processor 720 through one or more of the above buses or other communication links to communicate with processor 720. Image sensor 710 may include a pixel array that detects incident light to generate an analog signal, and an analog-digital conversion unit that performs a sigma-delta analog-digital conversion and a cyclic analog-digital conversion with respect to the analog signal to generate a digital signal in a first operation mode and performs a single-slope analog-digital conversion with respect to the analog signal to generate the digital signal in a second operation mode.

Image sensor 710 may include counter circuit block 500 of FIG. 8 or counter circuit block 600 of FIG. 10 or counter circuit block 600a of FIG. 15. Image sensor 710 may be embodied by image sensor 300 of FIG. 7 or image sensor 500 of FIG. 9. Because counter circuit blocks 400, 600, 600a and image sensors 300, 500 are described with the reference to FIGS. 1 through 15, detail description of image sensor 710 will be omitted.

Image sensor 710 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to an embodiment of the inventive concept, image sensor 710 may be integrated with processor 720 in one chip, or image sensor 710 and processor 720 may be implemented as separate chips.

Computing system 700 may be any computing system using an image sensor. For example, computing system 700 may include a digital camera, a mobile phone, a smart phone, a portable multimedia player (PMP), or a personal digital assistant (PDA), for example.

Figure 17:
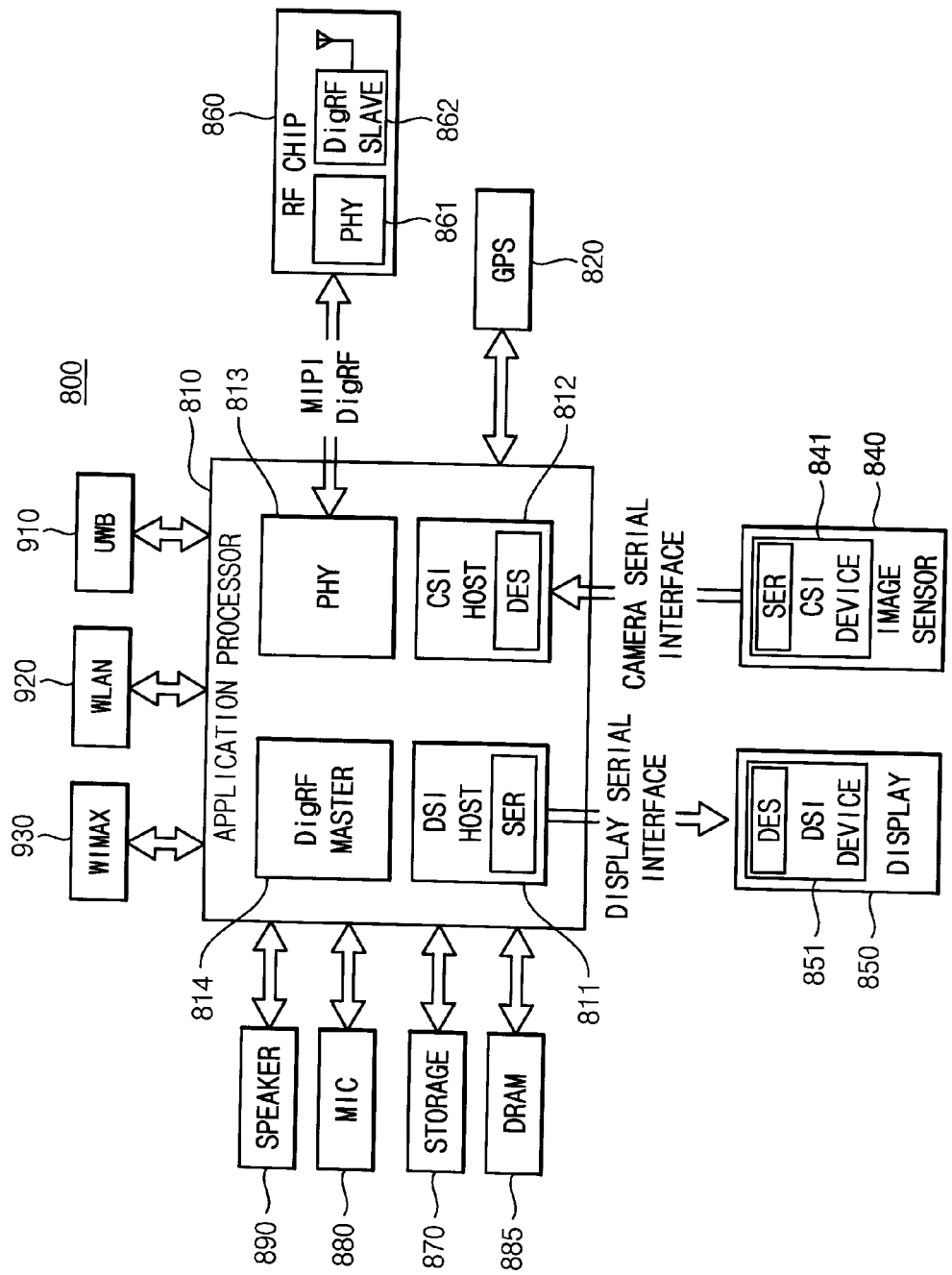
FIG. 17 is a block diagram illustrating an interface in the computing system of FIG. 16 according to an embodiment of the inventive concept.

FIG. 17 is a block diagram illustrating an interface used in the computing system of FIG. 16 according to an embodiment of the inventive concept.

Referring to FIG. 17, a computing system 800 may be implemented by a data processing device (e.g., a cellular phone, a personal digital assistant, a portable multimedia player, a smart phone, etc.) that uses or supports a mobile industry processor interface (MIPI) interface. Computing system 800 comprises an application processor 810, an image sensor 840, a display device 850, etc.

A CSI host 812 of application processor 810 may perform a serial communication with a CSI device 841 of image sensor 840 via a camera serial interface (CSI). In some embodiments, CSI host 812 comprises a deserializer (DES), and CSI device 841 may include a serializer (SER). A DSI host 811 of application processor 810 may perform a serial communication with a DSI device 851 of display device 850 via a display serial interface (DSI). In some embodiments, DSI host 811 may include a serializer (SER), and DSI device 851 may include a deserializer (DES).

Computing system 800 may further include a radio frequency (RF) chip 860 performing a communication with application processor 810. A physical layer (PHY) 813 of computing system 800 and a physical layer (PHY) 861 of RF chip 860 may perform data communications based on a MIPI DigRF. Application processor 810 may further comprise a DigRF MASTER 814 that controls the data communications according to the MIPI DigRF of PHY 861, and RF chip 860 may further include a DigRF SLAVE 862 controlled by DigRF MASTER 814.

Computing system 800 may further comprise a global positioning system (GPS) 820, a storage 870, a MIC 880, a DRAM device 885, and a speaker 890. In addition, computing system 800 may perform communication using an ultra wideband (UWB) 910, a wireless local area network (WLAN) 920, a worldwide interoperability for microwave access (WIMAX) 930, etc. However, the structure and the interface of computing system 800 are not limited thereto.

The foregoing is illustrative of example embodiments and is not to be construed as limiting thereof. Although a few example embodiments have been described, those skilled in the art will readily appreciate that many modifications are possible in the example embodiments without materially departing from the scope of the inventive concept. Accordingly, all such modifications are intended to be included within the scope of the inventive concept as defined in the claims.

What is claimed is:

1. An integrated circuit, comprising:
a first signal transfer block comprising first through (M)-th aligning blocks that are cascade-coupled to produce first aligned control signals through (M)-th aligned control signals, respectively, by aligning first control signals with a clock signal, wherein M is an integer greater than one; and
a functional block divided into first through (M)-th sub-functional blocks configured to perform a same function in parallel, each of the first through (M)-th sub-functional blocks operating according to corresponding ones of the first aligned control signals through (M)-th aligned control signals generated by the first through (M)-th aligning blocks.

2. The integrated circuit of claim 1, wherein the first aligning block comprises first aligners configured to generate the first aligned control signals by aligning the first control signals, and the (K+1)-th aligning block comprises (K+1)-th aligners configured to generate the (K+1)-th aligned control signals by aligning the (K)-th aligned control signals, where K is an integer greater than zero and less than M.

3. The integrated circuit of claim 2, wherein each of the first aligners and the (K+1)-th aligners comprises a buffer operating in synchronization with the clock signal.

4. The integrated circuit of claim 2, wherein each of the first aligners and the (K+1)-th aligners comprises a flip-flop operating in synchronization with the clock signal.

5. The integrated circuit of claim 1, wherein the first through (M)-th sub-functional blocks comprise a plurality of functional units performing a same function in parallel based on the first aligned control signals through (M)-th aligned control signals respectively.

6. The integrated circuit of claim 5, wherein the functional units are counters configured to convert analog signals into digital signals, the analog signals corresponding to intensity information of incident light into the image sensor.

7. The integrated circuit of claim 1, further comprising a second signal transfer block divided into (M+1)-th through (2M)-th aligning blocks that are cascade-coupled to provide (M+1)-th aligned control signals through (2M)-th aligned control signals by aligning second control signals with the clock signal.

8. The integrated circuit of claim 7, wherein the first through (M)-th sub-functional blocks operate based on the first aligned control signals through (M)-th aligned control signals and the (M+1)-th aligned control signals through (2M)-th aligned control signals generated by the (M+1)-th through (2M)-th aligning blocks, respectively.

9. An image sensor, comprising:
pixels configured to provide analog signals corresponding to intensity information of incident light;
comparators configured to produce compared result signals by comparing the analog signals to a ramp signal;
a first signal transfer block divided into first through (M)-th aligning blocks that are cascade-coupled to provide first aligned control signals through (M)-th aligned control signals by aligning first control signals with a clock signal, wherein M is an integer greater than one; and
a count executing block divided into first through (M)-th count executing units configured to perform a same counting function in parallel, each of the first through (M)-th count executing units operating according to the compared result signals and corresponding ones of the first aligned control signals through (M)-th aligned control signals generated by the first through (M)-th aligning blocks.

10. The image sensor of claim 9 further comprising:
a second signal transfer block divided into (M+1)-th through (2M)-th aligning blocks that are cascade-coupled to provide (M+1)-th aligned control signals through (2M)-th aligned control signals by aligning second control signals with the clock signal.

11. The image sensor of claim 10, wherein the first through (M)-th count executing units operate based on the first aligned control signals through (M)-th aligned control signals and the (M+1)-th aligned control signals through (2M)-th aligned control signals generated by the (M+1)-th through (2M)-th aligning blocks, respectively.

12. The image sensor of claim 11, wherein the first through (M)-th count executing units comprise a plurality of counters configured to perform a same counting function in parallel based on the first aligned control signals through (M)-th aligned control signals and the (M+1)-th aligned control signals through (2M)-th aligned control signals corresponding to the first aligned control signals through (M)-th aligned control signals, respectively.

13. The image sensor of claim 12, further comprising a timing control circuit configured to provide the first control signal and the second control signal.

14. The image sensor of claim 10, wherein each of the first through (M)-th count executing units comprises a plurality of counters, each of the counters comprising:
  a counting part configured to output a counting value of edges of a counter input signal as switch input signals;
  a first switch configured to output a portion of the switch input signals as a first switch output signal;
  a second switch configured to output the first switch output signal as a portion of second switch output signals; and
  a memory unit that stores the second switch output signals, outputs the stored second switch output signals as a memory output signal sequentially.

15. The image sensor of claim 14, wherein the first switch in each of the first through (M)-th count executing units operates based on corresponding ones of the first aligned control signals through (M)-th aligned control signals.

16. The image sensor of claim 15, wherein the second switch in each of the first through (M)-th count executing units operates based on each of the (M+1)-th aligned control signals through (2M)-th aligned control signals corresponding to the first aligned control signals through (M)-th aligned control signals.

17. A method, comprising:
  generating analog signals corresponding to intensity information of incident light;
  comparing the analog signals to a ramp signal to produce compared result signals;
  aligning first control signals with a clock signal to produce aligned control signals; and
  performing a counting function by operating a plurality of count executing units in parallel based on the compared result signals and the aligned control signals, the count executing units performing a same sub counting function.

18. The method of claim 17, wherein the aligning of the first control signals comprises operating a plurality of buffers in synchronization with the clock signal.

19. The method of claim 17, wherein the aligning of the first control signals comprises operating a plurality of flip-flops in synchronization with the clock signal.

20. The method of claim 16, wherein each of the count executing units comprises a plurality of counters, each of the counters comprising:
  a counting part configured to output a counting value of edges of a counter input signal as switch input signals;
  a first switch configured to output a portion of the switch input signals as a first switch output signal;
  a second switch configured to output the first switch output signal as a portion of second switch output signals; and
  a memory unit that stores the second switch output signals, outputs the stored second switch output signals as a memory output signal sequentially.

* * * * *